Sept. 7, 1937.  A. C. LINDGREN ET AL  2,092,608
DRAFT COUPLING DEVICE FOR TRACTORS
Filed Jan. 14, 1935  6 Sheets-Sheet 1

Sept. 7, 1937.   A. C. LINDGREN ET AL   2,092,608
DRAFT COUPLING DEVICE FOR TRACTORS
Filed Jan. 14, 1935   6 Sheets—Sheet 2

Inventors
Alexius C. Lindgren
Bert R. Benjamin
Carl W. Mott
By V. D. Lassagne
Atty.

Sept. 7, 1937.  A. C. LINDGREN ET AL  2,092,608
DRAFT COUPLING DEVICE FOR TRACTORS
Filed Jan. 14, 1935  6 Sheets-Sheet 4

Inventors
Alexius C. Lindgren
Bert R. Benjamin
Carl W. Mott
By V. J. Lasagne
Atty.

Sept. 7, 1937.  A. C. LINDGREN ET AL  2,092,608
DRAFT COUPLING DEVICE FOR TRACTORS
Filed Jan. 14, 1935  6 Sheets-Sheet 6

Patented Sept. 7, 1937

2,092,608

UNITED STATES PATENT OFFICE 2,092,608

DRAFT COUPLING DEVICE FOR TRACTORS

Alexus C. Lindgren, Chicago, Bert R. Benjamin, Oak Park, and Carl W. Mott, Rock Falls, Ill., assignors to International Harvester Company, a corporation of New Jersey Application January 14, 1935, Serial No. 1,608

15 Claims. (Cl. 97—47)

This invention relates to farm tractors and more particularly to features of construction which facilitate the connection and disconnection of draft elements or supporting frames for the various agricultural implements that may be mounted on or coupled to the tractor.

With the advent of the so-called general purpose tractor, agricultural implements were generally trailed behind the tractor. As the use of the tractor increased, implements were attached to the tractor. These implements generally required a great deal of time to attach and detach. The present invention provides for means for quickly attaching the drawbar to the tractor, or any implement that the operator wishes to use, in the minimum of time.

The main object of the invention is to provide convenient and readily accessible coupling structure on a tractor axle housing for connection with the draft members or frame pieces of various implements in a quick and simple manner, as particularly desirable with farm tractors of the general purpose type.

Another object is to so form the coupling structure as to make it of practically universal adaptability, thus permitting the draft frame members of the implements to be bolted or otherwise secured thereto at various positions or angles as required by the character or structure of the implement.

Another object is to form the rear axle housing with various integral parts whereby various implement attachments may be quickly mounted thereon.

Another object is to provide means whereby the implements to be attached may be kept in vertical position when detached, for subsequent attachment.

Another object is to provide means whereby the implements to be attached may be guided into position by the operator of the tractor by positioning means on the tractor and complementary means on the implement to be attached.

Other objects and advantages will appear in the following description of a preferred embodiment of the invention, as illustrated in the accompanying drawings, where,—

In the construction illustrated, the tractor has an oblong casing 20 forming the rear end of the tractor body and containing the transmission and differential mechanism. The rear portion of this casing has bolted, or otherwise secured to it, on each side, the aligned tubular axle housings 21 containing the bearings for the axle shafts 22, which extend beyond the ends of the housings. Traction wheels 23 are adjustably secured to the axle ends. The casing 20 supports the centrally located driver's seat 24 in convenient relation to the usual steering wheel 25 and other controls not shown. The casing 20 has suitable bearings in its lower portion for the central power take-off shaft 26, which projects from the rear wall thereof and is driven through suitable gearing within the casing. By means of the power take-off, the closely coupled implements requiring power may be driven therefrom.

Figure 1:
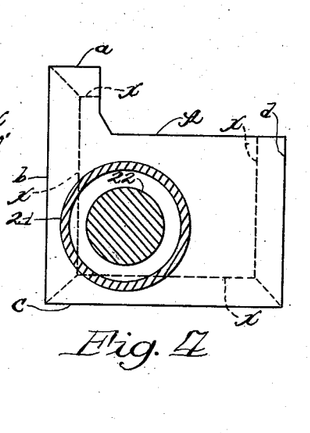
Figure 1 is a plan view of the rear portion of a tractor having a novel draft coupling structure on the axle housings.
Figure 2:
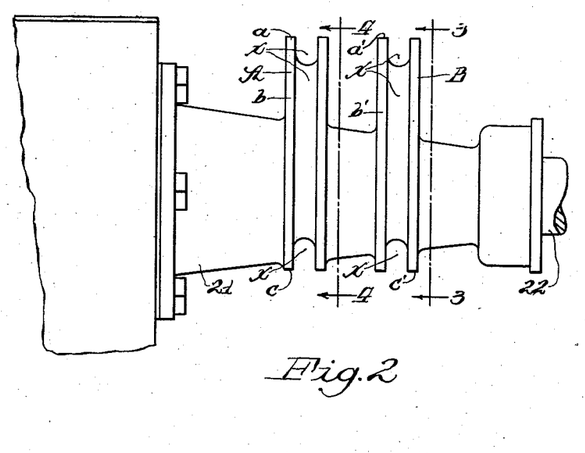
Figure 2 is a rear view of an enlarged section of the rear axle housing, showing the integral coupling brackets.
Figure 3:
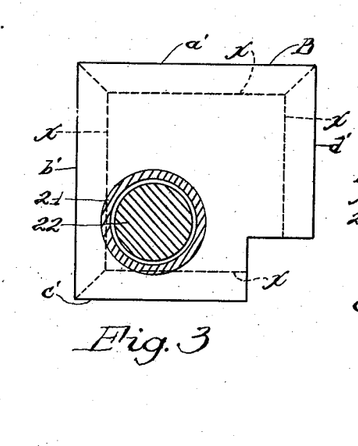
Figure 3 is a vertical view of an outer coupling bracket in the direction of the arrows on section 3—3 in Figure 2.
Figure 4:
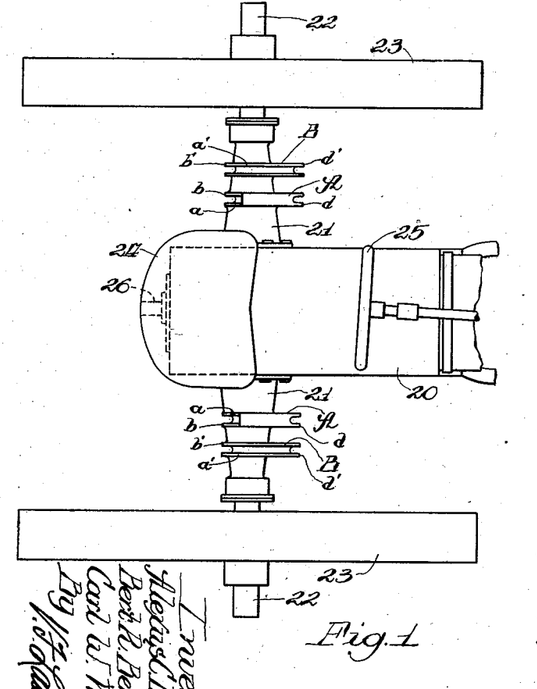
Figure 4 is a vertical view of an inner coupling bracket in the direction of the arrows on section 4—4 in Figure 2.

In the present invention, the opposite axle housings 21 are formed with frame mounting means consisting of integral projections or flanges A and B symmetrically placed. A denotes the inner flange, best shown in Figure 4, while B denotes the outer flange, best shown in Figure 3. The flanges A and B may be cast integrally with the housing, as shown, or made separately and securely fastened to the axle housings in any practical manner. In the embodiment most preferred, as shown here, the flanges A and B are preferably square in shape with the center of the flange placed eccentrically forwardly and above that of the axle housing center to obtain the greatest amount of clearance underneath the axle as possible. The top, rear, bottom and front surfaces or peripheral face-like attaching portions a, b, c, and d, and a', b', c', and d', respectively, of the flanges A and B all lie in the same transverse planes for the convenience in fastening brackets of the various implements to be coupled thereto. It is to be understood that the shape of the flanges A and B may be whatever is desired, but that the embodiment shown is the preferred form.

The attaching surfaces a, b, c, d, and a', b', c' and d' of the flanges A and B have grooves X throughout their length for the insertion of bolts or other fastening devices. The width of the flanges A and B is sufficient to accommodate a bolt and wide enough to provide sufficient bearing surface for any bracket fastened thereto.

The purpose of the inner flanges A is to fasten the draft connecting brackets of the implement, while the outer brackets B are used for fastening levers for operating the implements, though any combination or arrangement with the brackets may be used without departing from the scope of the invention.

The bracket A is cut away along the surface a and d. Bracket B is shown cut away on surface c' and d'.

Figures 5, 7:
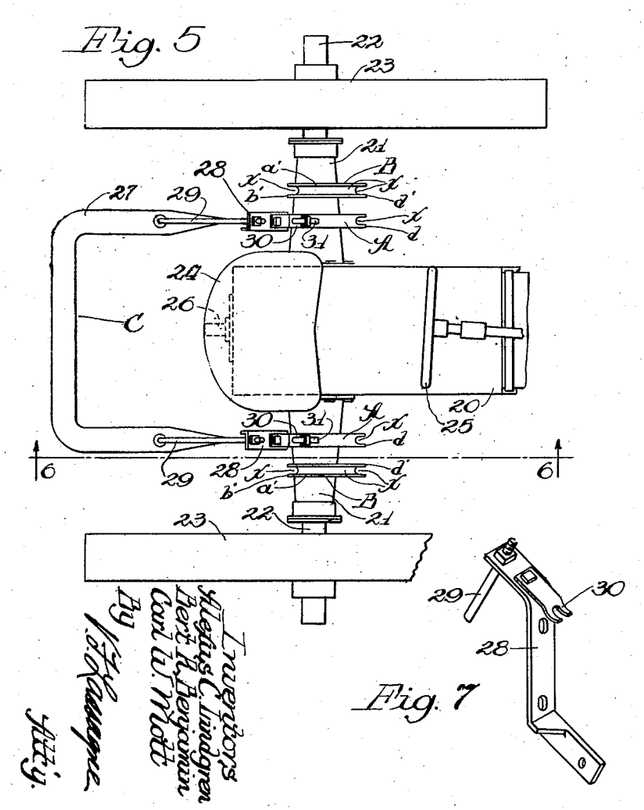
Figure 5 is a plan view of a rear portion of a tractor with a drawbar and means for mounting it to the coupling brackets.
Figure 7 is an enlarged portion of the supporting bracket for the drawbar.

Figure 5 shows a drawbar of a tractor connected to the flanges on the rear axle of the tractor. In order to connect the drawbar 27 to the tractor, coupling brackets 28 are formed from suitable structural shapes. They are bent to shape, best shown in Figures 7 and 8, with a forwardly extending part which pivotally supports the drawbar 27 and a rearwardly extending part to which the drawbar braces 29 are attached. Slots are provided in alignment with the grooves X in the flanges A. To provide ease in attaching the assembled drawbar structure, a support 30 is securely fastened to the rear extending part of the bracket 28. The support 30 has a notch cut out for the upper bolt 31 to be inserted, and it also has an upwardly bent end, which acts to guide and support the brackets 28 on the upper surface a of the bracket A during the coupling operation, and which also supports the nut on the bolt in the detached position shown in Figure 8.

Figure 6:
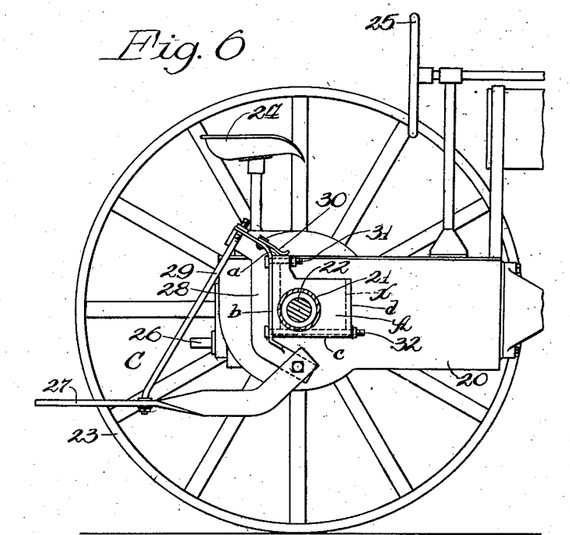
Figure 6 is an elevation of Figure 5 along section line 6—6, with the right rear wheel removed.
Figures 8, 8A:
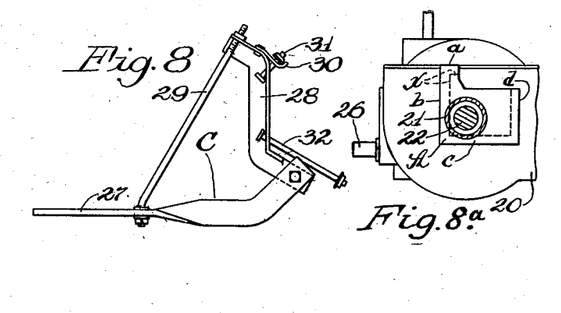
Figures 8 and 8a are elevations showing the bolts in position for quickly attaching the drawbar to the tractor.

In order to attach the assembled drawbar C to the flanges A on the tractor, the upper and lower bolts 31 and 32 are placed as shown in Figures 8 and 8a. The brackets 28 are aligned with the flanges A, as shown in Figure 6. The bolts 31 are dropped in their respective grooves and tightened, the support 30 acting as a temporary support. Then, the bolts 32 are raised in position and tightened. To remove the drawbar C, the procedure is reversed. To prevent the nuts from being lost, as it is not necessary to remove them, the ends of the bolts are upset or cotter keys may be inserted in the ends of the bolts. As described, the assembled drawbar C may be easily attached and detached by one person. The assembled drawbar C is shown with the drawbar 27 extended rearwardly. It is to be understood that the drawbar 27 may be extended forwardly by the use of special brackets, and, furthermore, suitable attachments may be directly supported on the drawbar.

Figure 9:
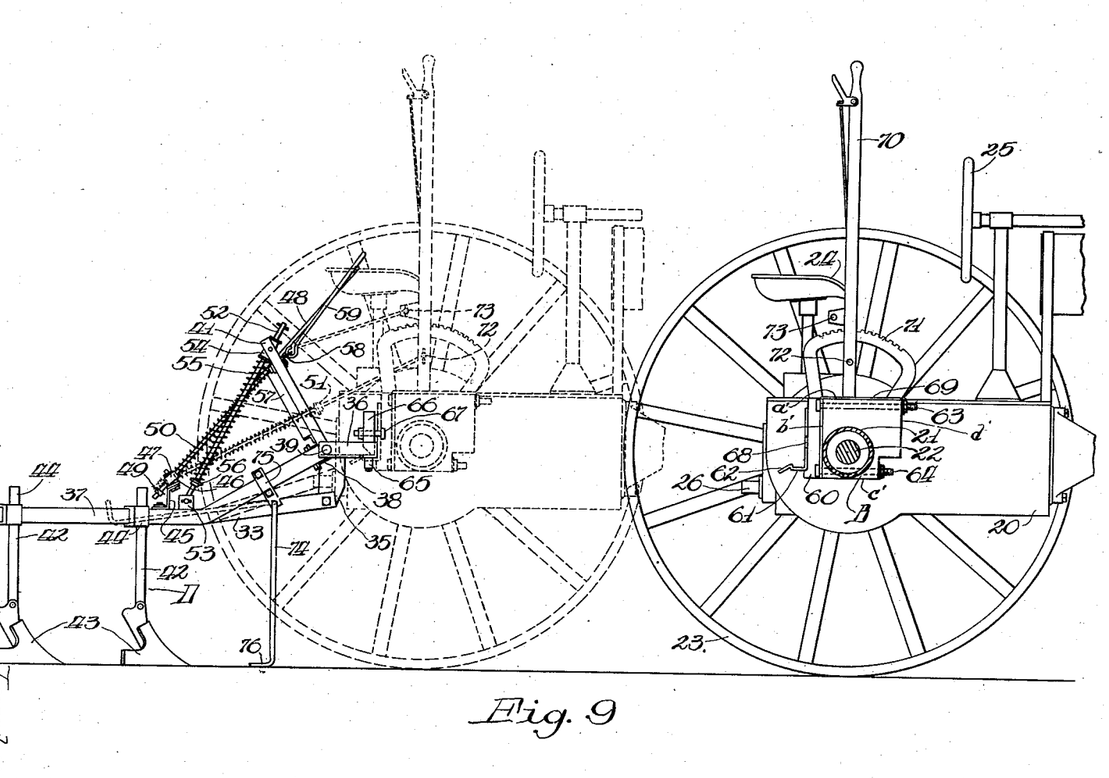
Figure 9 is an elevation of the rear portion of a tractor with the right wheel removed, showing one of the attaching brackets and a cultivator attached thereto.
Figure 10:
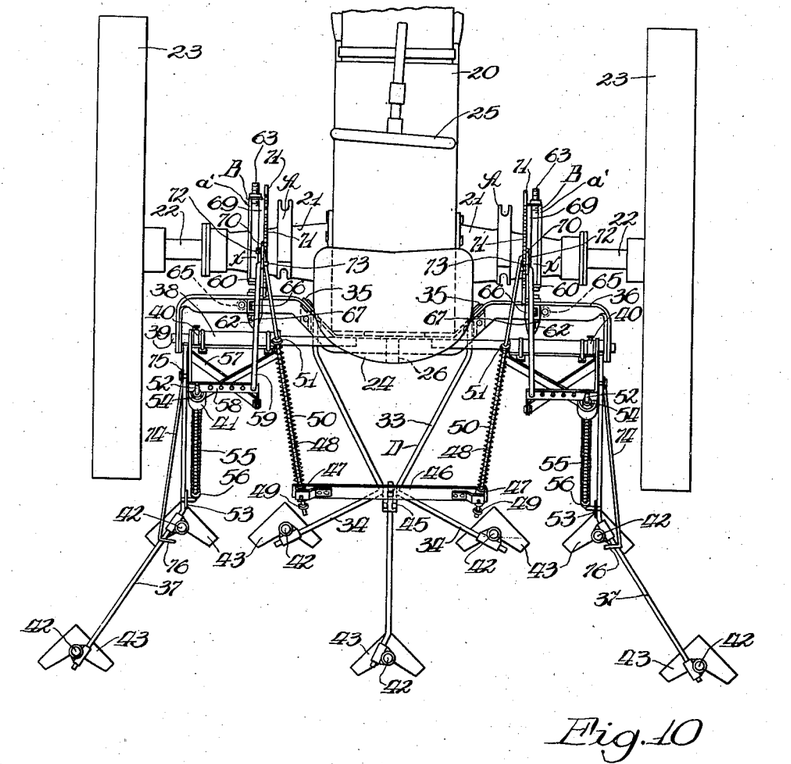
Figure 10 is a plan view of the rear portion of a tractor showing the special coupling brackets with a cultivator attached thereto.
Figure 11:
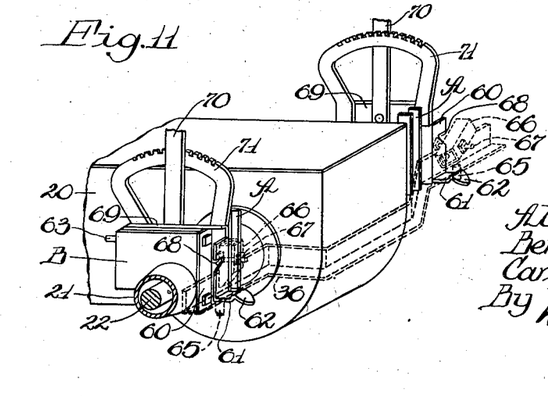
Figure 11 is a phantom view, showing the rear axle of a tractor with the integral coupling brackets for the implement.

Figures 9, 10 and 11 show the quick attachable coupling brackets necessary for attaching a cultivator. The cultivator attachment D of this invention is composed of three separate gangs arranged in straddling relation to the rows spanned by the wheels. One of the gangs is centrally mounted and the other two gangs are mounted at either side thereof in such manner as to permit the shovels carried thereby to cultivate behind the wheel treads, as shown. The central gang preferably comprises a Y-shaped beam 33, to which are attached the lateral and rearwardly extending arms 34. The forward ends of the Y-shaped beam 33 are pivotally connected to downwardly extending brackets 35, which are securely fastened to a transverse member 36, which is connected to the tractor. The lateral gangs 37 comprise a longitudinal, rearwardly extending portion and a portion extending rearwardly and laterally behind the traction wheels 23, as best shown in Figure 10. The inwardly extending portions of the gangs 37 are securely clamped to a pivoted and laterally sliding bracket 38 mounted on the transverse bars 39 rigidly connected to the rearwardly extending portion of the transverse members 36 at their inner ends and at their outer ends to rearwardly extending portions on the transverse member 36. The gangs 37 may be adjusted laterally on the transverse bars 39 by means of the adjusting collars 40, and the upwardly extending U-shaped brackets 41 with the open ends of the U pivoted to the bar 39 and the bracket 38, and with the adjusting collar 40 positioned therebetween. The usual shanks 42 with cultivator shovels 43 attached thereto are connected to the cultivator beams 33, 34 and 37 by the clamp brackets 44.

An upwardly extending support 45 is rigidly connected at the center of the Y-shaped beam 33. The upper end of the support 45 is bent to position, its upper surface in a downwardly and rearwardly inclined transverse plane, on which bent end there is positioned a transversely extending equalizer bar 46. This bar 46 is pivoted at its center to rock about an inclined axis extending longitudinally and in the transverse plane above referred to, and its ends extend laterally approximately to the ends of the lateral arms 34. At each end, the equalizer bar 46 is provided with forked ends, in which are pivoted the collars 47 in which the lifting rods 48 are permitted to slide. Adjustable stops 49 are placed at the lower ends of the lifting rods 48. Above the collar 47, pressure springs 50 are placed on the rods 48 and the compression of the springs is adjusted by the collars 51. The outer gangs have lifting rods 52 pivoted at their lower ends in brackets 53 securely fastened to the lateral gangs 37; and at their upper ends they are mounted in the collars 54, which are pivoted in the upper ends of the U-shaped brackets 41, through which collars the rods 52 are permitted to slide. The pressure of the rods 52 is adjusted by compression springs 55 mounted on the rods 52 between the pivoted collars 54 and the adjusting collars 56. A diagonal brace 57 is placed underneath and welded to the two legs of the V-shaped brackets 41. Angle iron brackets 58 with holes for the various adjustments of the raising and lowering links 58, when the gangs 37 are adjusted laterally, are positioned at the upper ends of the brackets 41 and welded thereto. The inner ends of the brackets 58 are bent downwardly and rearwardly and securely fastened to the diagonal brace 57.

In order to attach the cultivator attachment D just described and to operate the same, frame connecting brackets 60 are firmly attached to the outer flanges B on the tubular axle housings 21, as best shown in Figures 9 and 11. The brackets 60 are formed of channel steel with an upright leg having bolt holes in alignment with the top and bottom grooves on the flanges B and a rearwardly extending leg 61 forming an upwardly facing surface on which the bottom edge of the transverse member 36 may be supported horizontally, and which also prevents the member 36 from being displaced while being attached. An upwardly bowed end portion 62 acts on leg 61 as a guide as the tractor is backed into position, raising the transverse member 36 into its position on the horizontal surface of member 61. Long bolts 63 and 64 with nuts securely fasten the bracket 60 to the face b' of the flange B. Rollers 65, laterally spaced on the transverse member 36, are positioned to engage the outer edges of the portions 61, 62 of the bracket 60 and cause the member 36 to be aligned laterally as the tractor is backed into position. The rollers 65 are aligned outside of the portions 62, which are tapered to guide the centering of the parts. This is illustrated in Figure 11. Clamps 66 pivoted to the member 36 securely fasten the cultivator attachment D to the brackets 60 by means of bolts 67 slipped in the notches 68 with the heads of the bolts abutting the front inside of the rear web of the channel bracket 60 and the nuts on the bolts being drawn up tight against the clamps.

Flat plates 69 with outwardly extending ledges to rest on the inner edge of the surface a' of the flange B are securely fastened to the base of the brackets 60. Adjusting levers 70 are pivoted to the plates 69 and held in position by the quadrants 71, which are fastened to the plates 69. In order to raise and lower the gangs (implement attachment D) the lifting rods 48, which are attached to the equalizer, are pivotally connected to the adjusting levers 70 and 72 and secured thereto by the usual cotter keys. The raising and lowering links 59, which are connected to the outer gangs, are pivotally connected to the adjusting levers 70 at 73. To raise the shovel beams, the levers 70 are moved forwardly about the quadrants 71. The equalizer bar 46 permits one outer beam to be raised when one lever is operated and also the inner beam to be partially raised, so that upon operating the other lever to raise the other outer beam the inner beam is then completely raised out of working engagement with the soil.

The procedure is as follows in detaching and attaching the cultivator attachment, illustrated in Figure 9, to the tractor. The shovel beams 33 and 37 are lowered so that the shovels 43 are resting on the ground. The supports 74, which are pivotally connected to brackets 75 are adjustably fastened to the beams 37, so that the supports may be adjusted to keep the attachment in a level position for a subsequent attaching. The supports 74 when not in use are hooked over the beams 37 by means of the hooked feet 76. The clamps 66 are unloosened and the bolts 67 are removed from the slots 68. If the transverse member 36 does not come out of the slight depression in member 61, the levers 70 may be slightly adjusted to raise the member 36. The lifting rods 48 and the raising and lowering links 59 are disconnected from the levers 59 by the removal of the cotter keys. The operator is then ready to put on the drawbar attachment C, which only requires the inner flanges A on the rear axle. The operation described requires only a few minutes of the operator's time. If flanges B are needed for an attachment, the lever assemblies may be quickly detached by loosening the nuts on bolts 63 and 64, thus removing the bolts 63 from their grooves; the bolts 64 will already have dropped out of their grooves.

The attachment D may be as readily assembled. The lever assembly with the brackets 60 is quickly fastened to the brackets B. The tractor is backed into the attachment D, and, as the supports 74 keep the transverse member 36 at the correct height, the member 36 is guided or centered vertically by the rearwardly extending portions 61, 62, which also laterally adjusts the member 36 by means of the rollers 65. After the transverse member 36 is seated on the horizontal surface of member 61, the operator secures the clamps 66 and attaches the lifting rods and connecting links, and the attachment is connected and ready to operate. As described, it is readily seen that the attachment may be attached and detached very quickly and simply.

Figure 12:
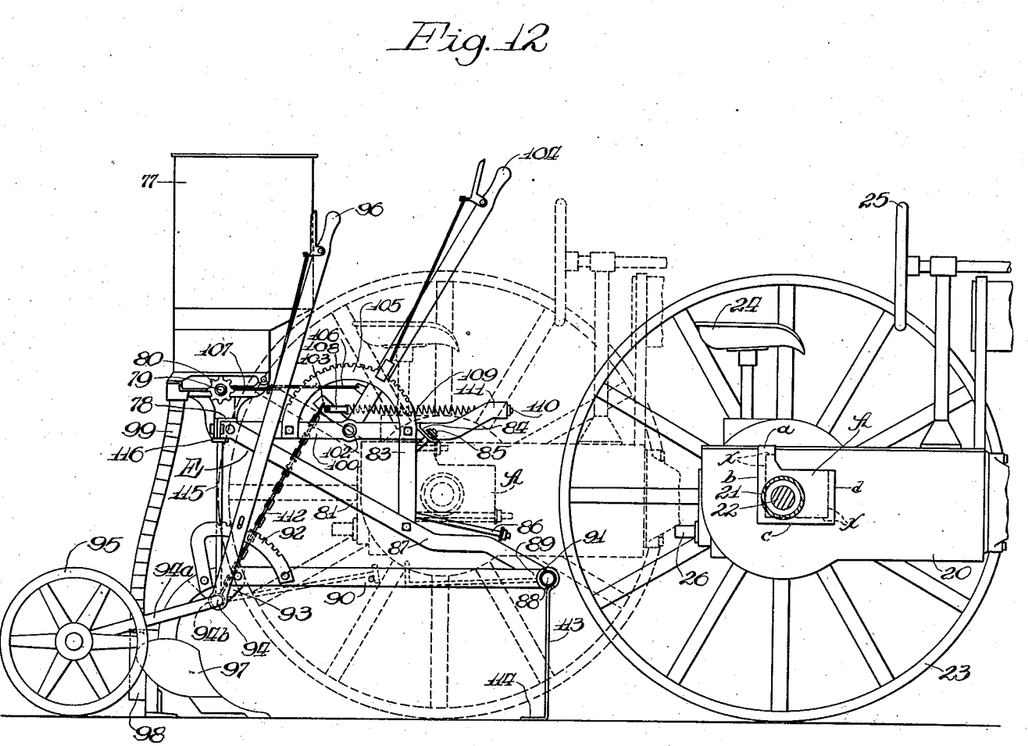
Figure 12 shows a planter attachment in elevation with quick detachable brackets for mounting to the coupling brackets.
Figure 13:
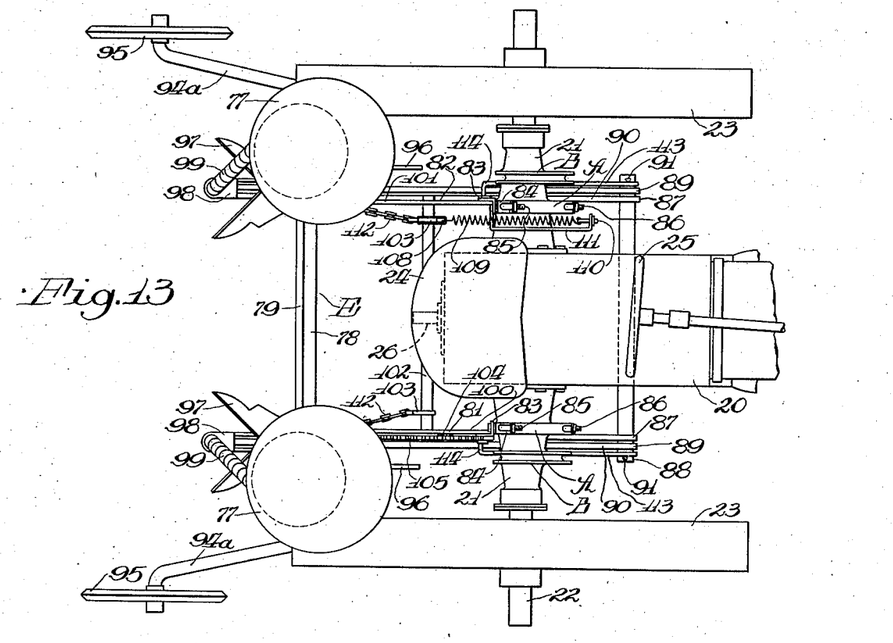
Figure 13 is a plan view of the planter attachment connected to the rear axle of the tractor; and, Figure 14 is a phantom view, showing the rear axle brackets and the quick detachable brackets on the planter attached thereto, showing the bolts in place for attaching.
Figure 14:
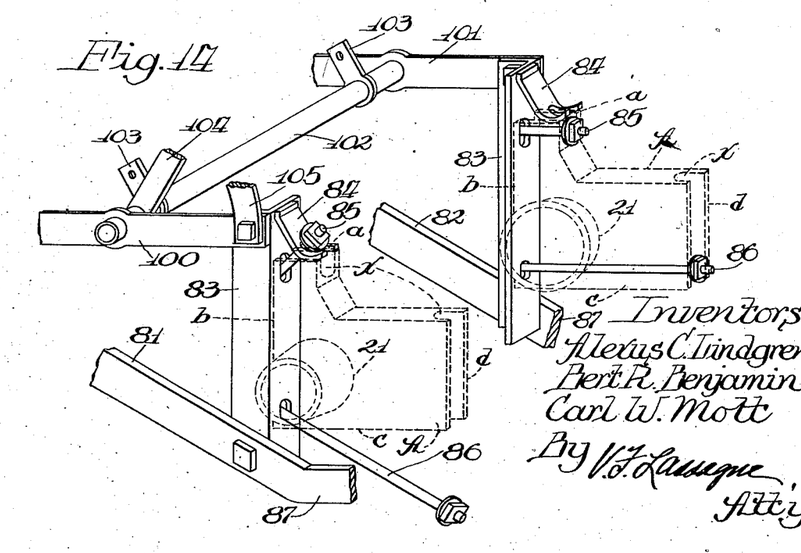

The invention has been further incorporated in a directly mounted planting attachment, which is attached to the flanges A on the rear axle of the tractor, as illustrated in Figures 12, 13 and 14. The attaching members are similar to the ones described in connection with the drawbar attachment C.

The planter attachment comprises the usual seed hoppers 77 attached to a transverse support 78. The seed mechanisms of the two hoppers 77 are driven by the laterally extending shaft 79, to which is mounted the sprocket 80 driven by a chain and sprocket, not shown, connected to the right rear axle shaft 22. The transverse support for the seed mechanism is firmly attached to the apex of two brackets 81 and 82 in the form of a triangle. The base member 83 of the triangular brackets has slots therein formed in alignment with the grooves X in the flanges A. To provide ease in attaching the planter attachment to the tractor when it is backed into assembling position, a support 84 is securely fastened to the upper part of the base member 83. The support 84 has a notch cut out for the upper bolt 85 to be inserted, and it also has an upwardly extending part, which acts as a guide on the upper surface a of the bracket A and which also supports the nut on the bolt in detached position, as shown in Figure 14.

In order to attach the assembled planter E to the flanges A on the tractor, the upper and lower bolts 85 and 86 are placed as shown at the right hand side of Figure 14. The brackets 81 and 82 are aligned with the flanges A as shown in Figure 14. The bolts 85 are dropped into their respective grooves and the nuts tightened thereon, the bolt supports 84 acting as temporary supports. The bolts 86 are then raised in position and the nuts tightened thereon. To remove the planter E, the procedure is reversed. In this instance also, to prevent the nuts from being lost, as it is not necessary to remove them, the ends of the bolts are upset, or cotter keys are inserted in the ends of the bolts.

The hypothenuses 87 of the triangular brackets 81 and 82 are extended downwardly approximately to the vertical axis of the rear wheels, then forwardly parallel to the ground line approximately to the forward end of the flanges A and B, and then downwardly, as shown. At the forward ends of the members 87 and secured thereto, a transverse draft member 88 extends laterally through the members 87 and outside thereof, to permit the forked ends 89 of the lister beams 90 to be adjusted laterally for rows of various widths. The beams are held in adjusted position by the pins 91 in holes in the transverse draft member 88, which permit the vertical movement of the lister beams 90. At the rear ends of the lister beams are secured adjusting quadrants 92 and supporting brackets 93, in which the transverse U-shaped axle 94 is pivoted. The U-shaped axle is made up of two stub axles 94ª pivotally secured in the ends of a horizontal pipe member 94ᵇ. Depth regulating wheels 95 are mounted on the stub axles 94ª. Adjusting levers 96 are secured to the stub axles 94ª and are adjustably attached for permitting the lateral spacing of the beams 90 on the U-shaped axle 94. The levers 96 are adjustable about the quadrants 92 and extend to operating position alongside the operator's station on the tractor. Lister plow points 97 and seed boots 98, to which the seed hoppers 77 are connected by flexible seed tubes 99, are secured to the downturned ends of the beams 90.

Midway of the horizontally positioned legs 100 and 101 of the triangular shaped brackets 81 and 82, respectively, is pivoted the transverse rockshaft 102, on which are mounted the lifting arms 103 and the adjusting lever 104 for raising and lowering the lister beams 90. The lever 104 is adjustably secured about the quadrant 105. To throw the planter mechanism in and out of gear as the lister beams are lowered or raised, a link 106 is attached to the clutch throw-out arm 107. To the left lifting arm 103 is pivoted a link 108, to which one end of the counter-balancing spring 109 is secured. The other end of the spring 109 is adjustably fastened by a threaded link 110 to the forwardly extending portion 111 of the horizontal leg 101.

To raise and lower the lister beams, chains 112 connect the lifting arms 103 to the horizontal member 94ᵇ of the transverse U-shaped axle 94. The lever 104 is used to raise the beams 90 in transporting and to adjust them to working position. The levers 96 are used to individually adjust the stub axles 94ª, to which the gauge wheels 95 are attached to overcome the inequalities of the planting depths, as, for instance, in working on side hills.

The procedure is as follows in detaching and attaching the planter attachment E, illustrated in Figure 12, to the tractor as a quick detachable implement, once the attachment has been assembled to the tractor, as previously described. The lister points 97 are lowered until they rest level on the ground. The depth regulator wheels 95 are also adjusted, so that they rest on the ground. The supports 113, which are pivotally connected to the draft member 88 and which have been hooked over the beams 90 by means of the hooked feet 114 thereon, since they are not needed when the machine is in use, are lowered, as shown in the full line construction in Figure 12. The vertical support 115 is unlatched from its dotted line position in Figure 12 and placed with its T-shaped end 116 underneath the transverse member 78 to prevent the attachment from collapsing when detached. The nuts on bolts 86 are unloosened and the bolts drop from the grooves in the flanges A. Likewise the nuts on bolts 85 are unloosened and the bolts raised from their grooves to lie in the bolt supports 84. The operator can now drive the tractor out from the attachment, and he is ready to attach any other implement such as the cultivator attachment or the drawbar. The operation described requires only a few minutes of the operator's time.

In order to attach the assembled planter attachment E to the flanges A on the tractor, the upper and lower bolts 85 and 86 are placed as shown in the right hand side of Figure 14. The brackets 81 and 82 are aligned with the flanges, as also shown in Figure 14. The bolts 85 are dropped in their respective grooves and tightened, the brackets 84 acting as temporary supports. Then, the bolts 86 are raised in position and tightened. The auxiliary supports 113 and the vertical support 115 are placed in their dotted line positions shows in Figure 12. The attachment is now ready to be operated.

As will be obvious to those skilled in the art, other arrangements of the integral flanges on the rear axle housings can be provided; likewise, other directly connected implements with suitable supporting brackets for connecting to the aforesaid flanges on the tractor. Furthermore, a wide range of utility is, therefore, obtainable to meet any requirement arising in connection with the various implements and parts that may be mounted on the tractor. The above disclosure illustrates several forms of the invention which may, however, be embodied in other forms within the scope of the appended claims.

What is claimed is:

1. The combination of a tractor having opposite rear axle housings, an implement attachment for said tractor, means on said rear axle housings for attaching said implement attachment comprising flanges laterally spaced and having means for receiving securing means, a plurality of faces on said flanges, means on said implement attachment for securing it to the faces of said flanges comprising bracket means and means positioned in said means for receiving securing means for securing said bracket means to certain faces of the flanges, a transverse member on said implement attachment for attaching said implement attachment to said bracket means, clamping means pivoted on said transverse member for securing it to said bracket means, means slotted in the bracket means for readily securing said clamping means, and fastening means adjustably secured to said clamping means and readily attached and detached to said bracket means by said slotted means.

2. The combination of a tractor having a frame, an implement attachment entirely supported at the rear of said tractor from said frame, laterally spaced means on the rear of said frame for supporting said implement attachment therefrom, means on said supporting means for positioning said implement attachment thereon, means for quickly attaching and detaching said implement attachment to said supporting means including complementary means on said implement attachment for aiding in said positioning, and means on said implement attachment whereby said implement attachment is supported at proper level when detached for subsequent attaching.

3. The combination of a tractor having a frame, an attachment entirely supported at the rear of said tractor from said frame, laterally spaced means on the rear of said frame for supporting said attachment therefrom, supporting means on said attachment to be attached to said laterally spaced means, guiding means on the supporting means for the attachment for positioning said attachment on said laterally spaced means, means for quickly attaching and detaching said supporting means to said laterally spaced means, and means on said guiding means whereby said attaching and detaching means may be held in position when detached for subsequent attaching.

4. The combination of a tractor having opposite rear axle housings, means on said rear axle housings for attaching an implement attachment thereto whereby said implement will be entirely supported from the rear axle housing, an implement frame, said frame comprising supporting brackets and pivoted implement beams with earth working tools thereon, means on said frame for quickly attaching and detaching said attachment to said first mentioned means, means on said implement attachment whereby said implement attachment may be retained at proper level when detached for subsequent attaching, said means comprising means for supporting said forward part of said implement frame with the earth working tools acting as a rear support and means between said pivoted implement beams and said supporting brackets to prevent their collapsing when detached from said tractor, and means on said implement frame for raising and lowering said implement beams.

5. In a quick attachable coupling device for tractor implements, the combination with a transversely extending portion of a tractor of a plurality of vertically disposed flange-like members thereon on each side of the longitudinal median line of the tractor, said members comprising inner and outer members symmetrically placed on said transverse portion each having angularly related peripheral face-like attaching portions with the face-like attaching portions of the inner members varied in configuration from those of the outer members, an implement frame having portions contacting the peripheral face-like attaching portions of certain of said symmetrically placed members, and fastening means for attaching and detaching said implement to said members.

6. The combination of a tractor having opposite rear axle housings, an implement attachment for said tractor, means on said rear axle housings for attaching said implement attachment thereto, means on said implement attachment for securing it to said first mentioned means, means for vertically positioning said implement attachment, means for laterally positioning said attachment when said tractor is moved into attaching position with respect thereto, and means for latching said implement attachment in position on said second mentioned means.

7. The combination of a tractor having opposite rear axle housings, an implement attachment for said tractor, means on said rear axle housings for attaching said implement attachment thereto including means for vertically and laterally positioning said implement attachment when said tractor is moved into attaching position with respect thereto, and means for latching said implement attachment in position on said attaching means.

8. The combination of a tractor having opposite rear axle housings, an implement attachment for said tractor, means on said rear axle housings for attaching said implement attachment thereto, means on said implement attachment for securing it to said first mentioned means, means for vertically positioning said implement attachment, means for laterally positioning said implement attachment when said tractor is moved into attaching position with respect thereto, means for latching said implement attachment in position on said second mentioned means, and means on said implement attachment whereby said implement attachment is supported at proper level, when detached, for subsequent attaching.

9. The combination of a tractor having opposite rear axle housings, an implement attachment for said tractor, means on said rear axle housings for attaching said implement attachment thereto, means on said implement attachment for securing it to said first mentioned means, means for vertically and for laterally positioning said implement attachment when said tractor is moved into attaching position with respect thereto, means for latching said implement attachment in position, and means on said implement attachment whereby said implement attachment is supported at proper level, when detached, for subsequent attaching.

10. The combination of a tractor having opposite rear axle housings, an implement attachment supported from said housings, laterally spaced means on said housings for supporting said implement attachment therefrom, bracket means on said supporting means for positioning said implement attachment thereon, means for attaching and detaching said bracket means to said supporting means, complementary means on said implement attachment for aiding in said positioning, means for attaching and detaching said implement attachment on said bracket means, and means on said implement attachment whereby said attachment is supported at substantially the level of the positioning means, when detached, for subsequent attaching.

11. The combination with a tractor having laterally extending rear axle housings and coupling means on the housings intermediate the ends thereof for attaching an implement attachment to said axle housings; of an implement attachment comprising supporting means complementary to said coupling means, means for securing said supporting means to said coupling means whereby said implement attachment is wholly supported from said rear axle housing in transport position, and ground engaging means on said implement attachment for supporting said implement attachment in detached position at proper level for subsequent attachment.

12. The combination of a tractor having opposite rear axle housings, an implement supporting attachment for said tractor, a plurality of flanges formed integral with said rear axle housings, said flanges being laterally spaced and each flange having a rearwardly and an upwardly directed attaching surface, means in said flanges for receiving fastening means, bracket members on said attachment having parts engaging the upwardly directed surfaces of said flanges, and fastening means for securing said bracket members to the rearwardly directed surfaces of said flanges, whereby the draw-bar attachment will be entirely supported from the rear axle housing.

13. The combination of a tractor having opposite rear axle housings, an implement attachment for said tractor, frame mounting means on said rear axle housings for attaching said implement attachment thereto, means on said implement attachment for securing it to said frame mounting means, and cooperating means on the frame mounting means and implement attachment for vertically and laterally positioning said implement attachment when the frame mounting means and attachment are brought into engagement.

14. The combination of a tractor having opposite rear axle housings, an implement attachment for said tractor, frame mounting means on said rear axle housings for attaching said implement attachment comprising projecting portions of the housings, means on said projecting portions for coupling the implement attachment thereto, said means comprising coupling brackets, means for securing said brackets to said projecting portions, means on said brackets for positioning said implement attachment vertically when moved into engagement, a transverse member on said implement attachment for attaching it to said brackets, means on said transverse member complementary to the positioning means on the brackets for guiding said implement into position, and means on said transverse member for securing it to said brackets.

15. The combination of a tractor having a rear axle, frame mounting means on the axle at opposite sides of the longitudinal median line of the tractor, each mounting means comprising a projecting portion of the axle having an upright attaching surface and an upwardly facing surface extending from said upright surface, said surfaces on the respective projecting portions of the axle lying in the same planes, an attachment frame comprising members having portions engaging the upwardly facing surfaces of said frame mounting means and supported thereon and other portions engaging the upright attaching surfaces, and means for clamping said members of the frame against the upright surfaces of the frame mounting means.

ALEXUS C. LINDGREN.
BERT R. BENJAMIN.
CARL W. MOTT.